United States Patent
Norton et al.

(12)

(10) Patent No.: US 10,791,613 B1
(45) Date of Patent: Sep. 29, 2020

(54) WIRELESS LIGHTING CONTROL SYSTEM WITH AUTOMATIC EMERGENCY MODE EXIT NETWORK PROTOCOL

(71) Applicant: ABL IP HOLDING LLC, Conyers, GA (US)

(72) Inventors: Timothy Mark Norton, Oxford, GA (US); Scott Ingraham, Snellville, GA (US); Gomez Sam Selvaraj, Grayson, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/811,306

(22) Filed: Mar. 6, 2020

Related U.S. Application Data

(63) Continuation of application No. 16/666,633, filed on Oct. 29, 2019, now Pat. No. 10,652,972.

(51) Int. Cl.

| | | |
|---|---|---|
| *H05B 47/19* | (2020.01) | |
| *H05B 37/02* | (2006.01) | |
| *H02J 9/02* | (2006.01) | |
| *H05B 45/00* | (2020.01) | |
| *H05B 47/12* | (2020.01) | |
| *G08B 5/22* | (2006.01) | |
| *H05B 47/11* | (2020.01) | |

(52) U.S. Cl.
CPC ............ *H05B 47/19* (2020.01); *H02J 9/02* (2013.01); *H05B 45/00* (2020.01); *G08B 5/22* (2013.01); *H05B 47/11* (2020.01); *H05B 47/12* (2020.01)

(58) Field of Classification Search
CPC .... H05B 37/02; H05B 37/0272; H05B 33/08; H05B 47/10; H05B 47/19; H05B 45/30; H02J 9/00; H02J 9/02; H02J 9/04; H02J 9/065; F21S 9/00; F21S 9/022; F21S 9/024

See application file for complete search history.

(56) References Cited

U.S. PATENT DOCUMENTS 9,820,361 B1   11/2017   Turvy, Jr. et al.
9,883,570 B1    1/2018   Turvy, Jr. et al.
(Continued)

OTHER PUBLICATIONS

Entire patent prosecution history of U.S. Appl. No. 16/666,633, filed Oct. 29, 2019, entitled "Wireless Lighting Control System With Automatic Emergency Mode Exit Network Protocol."

*Primary Examiner* — Thai Pham
(74) *Attorney, Agent, or Firm* — RatnerPrestia

(57) ABSTRACT

In response to determining that the line power source for a subset or all member devices of a lighting control group is interrupted, an emergency luminaire enters an emergency mode (EM) active state by controlling a light source, via a driver circuit, to continuously emit emergency illumination lighting. Upon entering the EM active state, the emergency luminaire transmits, via a wireless lighting control network, an EM active message to a lighting control group repeatedly at a predetermined time interval. Emergency luminaire receives, via the wireless lighting control network, an EM exit message from another member device indicating to exit the EM active state. In response to receiving the EM exit message from the other member device, the emergency luminaire exits the EM active state by controlling the light source, via the driver circuit, to discontinue emitting the emergency illumination lighting.

22 Claims, 11 Drawing Sheets

(56) References Cited

U.S. PATENT DOCUMENTS

| | | | |
|---|---|---|---|
| 10,085,328 B2 * | 9/2018 | Barna | H04W 24/08 |
| 10,416,243 B2 | 9/2019 | Nelson et al. | |
| 2010/0327766 A1 * | 12/2010 | Recker | H02J 7/025 |
| | | | 315/291 |
| 2013/0127362 A1 * | 5/2013 | Trainor | G01R 31/44 |
| | | | 315/224 |
| 2014/0028200 A1 * | 1/2014 | Van Wagoner | H05B 47/10 |
| | | | 315/158 |
| 2017/0223807 A1 * | 8/2017 | Recker | H05B 47/16 |
| 2019/0252911 A1 * | 8/2019 | Roquemore, III | F21V 23/0457 |

* cited by examiner

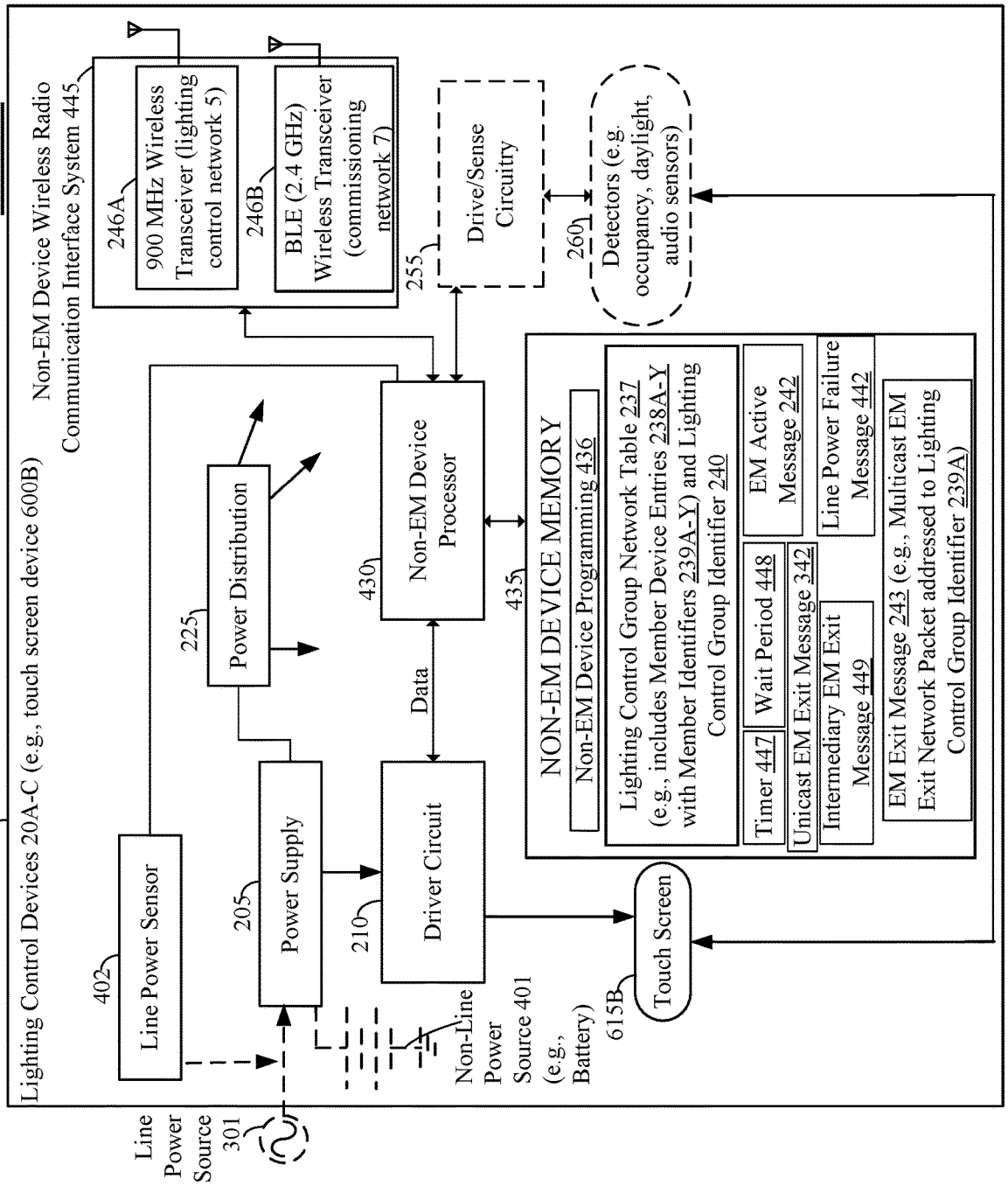

WIRELESS LIGHTING CONTROL SYSTEM WITH AUTOMATIC EMERGENCY MODE EXIT NETWORK PROTOCOL

CROSS-REFERENCE TO RELATED APPLICATIONS

This is a Continuation Application of U.S. patent application Ser. No. 16/666,633, filed Oct. 29, 2019, now allowed, the disclosure of which is incorporated herein by reference in its entirety for all purposes.

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some luminaires, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

During emergency conditions, a building (e.g., school or office building) may require evacuation as quickly and safely as possible. When a line power source (e.g., wall power or street power) that powers regular luminaires is interrupted, building codes typically require illumination of the egress pathway using emergency lights. Specific designated egress pathway areas are typically targeted for emergency illumination—stairs, aisles, hallways, ramps, escalators, walkways, and exit passages. Such pathways for egress and exit signage are needed to guide and direct occupants of the building to a public way (e.g., street).

Emergency luminaires continuously emit emergency illumination lighting at an emergency illumination levels, for example at a minimum of 1.0 foot candles (fc) for a 90 minute period. Currently with emergency luminaires, as per Underwriter Laboratories 924 (UL924) standards in the industry for emergency lighting, every emergency light that enters into emergency mode stays for 90 minutes irrespective of recovery of a line power source. The emergency luminaire will remain fully illuminated for at least 90 minutes and normal control restored after a timer set for 90 minutes expires. Because emergency illumination lighting continues to be emitted by the emergency luminaire after line power is restored, electricity is needlessly wasted by the emergency luminaire. Besides power savings, there are other drawbacks to the 90 minute timer approach, fails to detect restoration of line power. In school classrooms where frequent power blips occur due to thunderstorms, teachers are faced with a 90 minute period during which the emergency light fixtures are stuck on at full brightness, which is distracting to the occupants.

Regarding emergency luminaires, U.S. Pat. No. 10,416,243, issued on Sep. 17, 2019, titled "Test Configuration for Emergency Lighting Fixtures," to applicant ABL IP Holding, LLC, which is incorporated by reference as if fully set forth herein, describes an emergency light fixture and a test configuration. U.S. Patent Publication No. 2019/0252911, published on Feb. 13, 2019, titled "Light Fixture with Power Loss Detection and Emergency Egress Mode," to applicant ABL IP Holding, LLC, which is incorporated by reference as if fully set forth herein, describes a technique for detecting power loss by a driver in an emergency light fixture and switching the emergency light fixture from a normal operation mode to an emergency mode upon detecting the power loss.

Conventional wall switches and luminaires communicate over wired systems. More recent lighting systems are wireless, which allow communication over a radio frequency (RF) network. Regarding wireless lighting control systems, U.S. Pat. No. 9,820,361, issued on Nov. 14, 2017, titled "Wireless Lighting Control System," to applicant ABL IP Holding, LLC, which is incorporated by reference as if fully set forth herein, describes a wireless lighting control system that is commissioned over a commissioning network and is controlled over a wireless lighting control network. U.S. Pat. No. 9,883,570, issued on Jan. 30, 2018, titled "Protocol for Lighting Control via a Wireless Network," to applicant ABL IP Holding, LLC, which is incorporated by reference as if fully set forth herein, describes a wireless lighting control system with lighting control groups.

However, there is no specific network control protocol for emergency luminaires in the wireless lighting control system. Accordingly, efficient network protocols are needed for a wireless lighting control system to allow wirelessly controlled emergency luminaires to efficiently and automatically turn off when line power is restored to overcome these and other limitations in the art.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 6A-B are block diagrams of non-EM devices (e.g., lighting control devices), specifically a wall switch and a touch screen device, of the lighting control group that communicate via the wireless lighting control system of FIG. 1.

DETAILED DESCRIPTION

Figure 1:
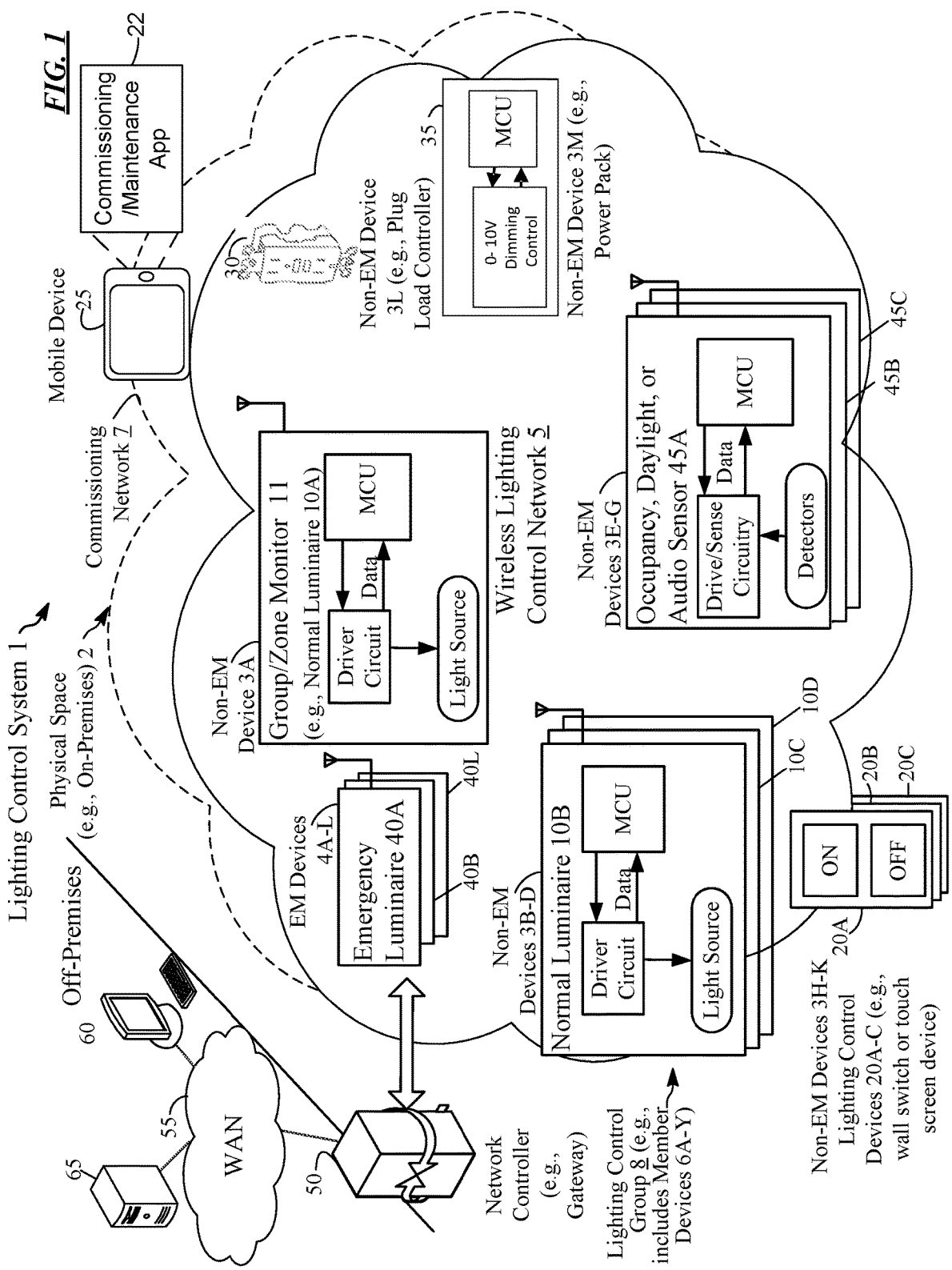
FIG. 1 is a high-level functional block diagram of an example of a system of networks and emergency mode (EM) and non-EM devices that support an automatic EM exit network protocol for emergency illumination lighting.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting control system" or "lighting system" as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting" or "illumination lighting" as used herein, are intended to encompass essentially any type of lighting in which a luminaire produces light by processing of electrical power to generate the light. A luminaire for artificial lighting or illumination lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 is a high-level functional block diagram of an example of a lighting control system 1 that includes twelve emergency mode (EM) devices 4A-L and thirteen non-EM devices 3A-M and supports an automatic EM exit network protocol for emergency illumination lighting. Lighting control system 1 supports light commissioning/maintenance network communication over a wireless commissioning network 5 and provides a variety of lighting controls of a lighting control group 8 over a separate wireless lighting control network 7. In the example, the lighting control group 8 includes twenty-five member devices 6A-Y (twelve EM devices 4A-L and thirteen non-EM devices 3A-M). Lighting control communication include communications in support of turning lights on/off, dimming, set scene, and sensor trip events.

Lighting control system 1 may be designed for indoor commercial spaces. As shown, lighting control system 1 includes a variety of lighting network elements, including non-EM devices 3A-M and EM devices 4A-L (e.g., emergency luminaires 40A-L). Generally, the non-EM devices 3A-M and EM devices 4A-L execute a lighting application for communication over a wireless lighting control network communication band, of control and systems operations information during wireless lighting control network 5 operation over the lighting control network communication band.

A lighting control group 8 includes a plurality of member devices 6A-Y, which are shown as the non-EM devices 3A-M and EM devices 4A-L. Hence, member devices 6A-Y include a group/zone monitor 11, emergency luminaires 40A-L, non-EM devices 3A-M. Non-EM device 4A is a normal luminaire 10A that is configured as group/zone monitor 11 of the lighting control group 8. Non-EM devices 3B-D are each normal luminaires 10B-D. Non-EM devices 3E-G are each occupancy, daylight, or audio sensors 45A-C to enable controls for occupancy and dimming. Non-EM devices 3H-K are lighting control devices 20A-C (e.g., a wall switch or touch screen device). Non-EM device 3L is a plug load controller 30 and non-EM device 3M is a power pack 35. EM devices 4A-L are emergency luminaires 4A-L.

As shown, each of the EM devices 3A-M and EM devices 4A-L include an on-board micro-control unit (MCU) that includes a memory (volatile and non-volatile) and a central processing unit (CPU). As shown, the non-EM devices 3A-D (luminaires 10A-D) have an MCU coupled to a driver circuit that controls light source operation of a light source. Non-EM devices 3E-G (occupancy, daylight, or audio sensors 45A-C) have an MCU coupled to drive/sense circuitry operable to control detectors. Non-EM device 3M (e.g., power pack 35 has an MCU operable to control a 0-10 Volt (V) dimming control signal.

Control, configuration, and maintenance operations of the wireless lighting control system 1 involve networked collaboration between the EM devices 4A-L and the non-EM devices 3A-M that comprise the lighting control group 8. An installation in a physical space 2 on-premises (e.g., interior to a building or exterior) is comprised of one or more lighting control groups each operating independently of one another. One or more lighting control groups may exist in the wireless lighting control network 5. Each lighting control group will have a group monitor, and this is shown in FIG. 1, where lighting control group 8 has non-EM device 3A designated as the group/zone monitor 11.

EM devices 4A-L and the non-EM devices 3A-M communicate control over a 900 MHz (sub-GHz) wireless lighting control network 5 and accordingly each include a first radio in the sub-GHz range. A variety of controls are transmitted over wireless lighting control network 5, including, for example, turn lights on/off, dim up/down, set scene (e.g., a predetermined light setting), and sensor trip events. In a first example, each EM device 4A-L and non-EM device 3A-M is also equipped with a second near range Bluetooth Low Energy (BLE) radio that communicates over commissioning network 7 for purposes of commissioning and maintenance of the wireless lighting control system 1, however no controls pass over this commissioning network 7. In a second example, wireless lighting control network 5 and commissioning network 7 are combined, such that both commissioning/maintenance and lighting controls pass over the GHz range wireless communication band (e.g., 2.4 GHz BLE). In the second example, each EM device 4A-L and non-EM device 3A-M are only equipped with a near range Bluetooth Low Energy (BLE) radio.

Plug load controller 30 plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning and maintenance operations and processes wireless lighting controls in order to the allow the lighting device to operate in the lighting control system 1. The plug load controller 30 can also be the AC receptacle itself.

Power pack 35 retrofits with existing wired light fixtures. The power pack 35 instantiates the wired light fixture by allowing for commissioning and maintenance operations and processes wireless lighting controls in order to allow the lighting device to operate in the wireless lighting control system 1. Both plug load controller 30 and power pack 35 can include the same or similar circuitry, hardware, and software as luminaires 10A-D and lighting control devices 20A-C.

The system 1 is provisioned with a mobile device 25 that includes a commissioning/maintenance application 22 for commissioning and maintenance functions of the lighting control system 1. For example, mobile device 25 enables mobile commissioning, configuration, and maintenance functions and can be a PDA or smartphone type of device with human interfacing mechanisms sufficient to perform clear and uncluttered user directed operations. Mobile device 25 runs mobile type applications on iOS7, Android KitKat, and windows 10 operating systems and commissioning/maintenance application 22 to support commissioning.

Web enabled (cloud) services for facilitating commissioning and maintenance activities is also provided by mobile device 25. The commissioning/maintenance application 22 of mobile device 25 interfaces with the cloud services to acquire installation and configuration information for upload to EM devices 4A-L and the non-EM devices 3A-M. The installation and configuration information is sent by mobile device 25 to the gateway 55. The gateway 50 engages in communication through the wide area network (WAN) 55.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model-transport, network, media access control (MAC)/physical layer (PHY) functions. The sub-GHz communications of the wireless control network 5 features are built on a near 802.15.4 MAC and PHY implantation with network and transport features architected for special purpose control and air time optimizations to limit chatter.

Lighting control system 1 can be deployed in standalone or integrated environments. Lighting control system 1 can be an integrated deployment, or a deployment of standalone groups with no gateway 50. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 50 for backhaul connection, time sync control, data collection and management capabilities, and interoperation with the Acuity Brands Lighting's commercially available SensorView product may also be provided.

Groups are formed during commissioning of the lighting control system 1 where all members of the group are connected together over wireless lighting control network 5, which in our example is a sub-GHz subnetwork defined by an RF channel and a lighting control group identifier 240.

The EM devices 4A-L and non-EM devices 3A-M subscribe to channels and only listen for/react to messages on the RF channel with the identifier (ID) of the subscribed channel that designates the lighting control group 8 that the EM device 4A-L and non-EM device 3A-M is a member of. For example, the EM devices 4A-L and non-EM devices 3A-M subscribe to a multicast group as identified by the lighting control group identifier 240 and only react to messages on the RF channel of the lighting control group 8.

In general, lighting control groups do not share RF channels and thus form their own RF subnetwork, however with only 12 available channels some overlap is inevitable. Analysis and simulation have indicated that group distribution and spatial separation will mitigate the congestion and collision side effects that can occur when many EM devices 4A-L and non-EM devices 3A-M share a singular RF enclave.

A group can be further divided to address control to specific control zones within the group defined by a control zone identifier. Zone communications are managed as addressable features at run time. Up to 16 independent zones of control are available for each lighting control group and each lighting control group can support up to 128 addressable lighting system elements (EM devices 4A-L and non-EM devices 3A-M).

The wireless lighting control network 5 distributes control messages and events, network management messages and events, health and failover events, and group commissioning and maintenance communications, such as firmware update distributions and group membership changes.

Wireless lighting control network 5 provides a secure control network (sub-GHz) on which to operate. Devices are manually added to the wireless lighting control network 5 via the commissioning process via commissioning/maintenance application 22 of mobile device 25. The commissioning process includes authorization and authentication features that allow only trusted and known entities to add confirmed devices (EM devices 4A-L and non-EM devices 3A-M) to the wireless lighting control network 5. Requirements relating to network modification (device add/delete/modify) are allocated to the mobile device 25 and its interface (commissioning/maintenance application 22) to the lighting control system 1.

Message authentication in the lighting control system 1 is provided by the 802.15.4 compliant MAC layer solution commercially available from Silicon Labs. The solution uses the AES CCM block cypher mode of operation to secure over the air frames. The mode of operation provides NIST compliant authentication, encryption, and integrity assurance to defeat replay attacks as well as device and message spoofing.

Lighting control system 1 also implements an additional layer of authentication by performing checks on the message source and addressing mechanisms to reject messages from unknown sources (i.e. sources that are not authorized members of a lighting control group network). An intrusion detection scheme using the above schemes and that reports such events will be made via the gateway 50. The sub-GHz MAC/PHY (wireless control network 5) thus provides secure communication features (authentication, data integrity, and encryption assurance) based on the 802.15.4 standard.

EM devices 4A-L and non-EM devices 3A-M of the wireless lighting control group 8 together may engage in any-to-many (unicast, multicast, or broadcast) communication and can implement a non-mesh wireless network topology. In our example, wireless lighting control network 5 is a star topology network. Although other network schemes may be utilized, a star topology may be the best fit for aligning the required control communications features with the characteristics of sub-GHz wireless radio. At the center of each lighting control group in a star topology wireless control network 5 is a singular group monitor as shown in FIG. 1. Non-EM device 3A (e.g., normal luminaire 10A) is the group monitor 11 for lighting control group 8.

The group/zone monitor 11 is responsible for receiving control events from their source (EM devices 4A-L and non-EM devices 3A-M) and ensuring reliable and timely delivery of the event to the other members of the lighting control group 8. The group/zone monitor 11 uses a quick best effort multicast mechanism for fast high-probability delivery. The group/zone monitor 11 can follow up the multicast with a reliable point to point communication to ensure that all destination devices received the event.

Commissioning

Commissioning is the process that sets the lighting control configuration and settings that drive the behavior of the lighting control system 1. One or more mobile devices 25 can be used to commission the installation of lighting control system 1. During setup, commissioning/maintenance application 22 of the mobile device 25 provides a secure method for a system installer to configure the EM devices 4A-L and non-EM devices 3A-M for installation commissioning.

General behavioral settings and network addressing information are stored on the mobile device 25 for upload and allocation to the installation's EM devices 4A-L and non-EM devices 3A-M via commissioning/maintenance application 22. The installation information is managed by commissioning/maintenance application 22 of mobile device 25 to ensure correctness and to eliminate common errors such as assignment of duplicate network addresses. Communication between the mobile device 25 for commissioning/maintenance and the EM devices 4A-L and non-EM devices 3A-M is over the commissioning network 7, such as a BLE network. The EM devices 4A-L and non-EM devices 3A-M are initially in an installation state, beaconing their advertisements when the commissioning starts.

Upon connection with the mobile device 25, the commissioning/maintenance application 22 of mobile device 25 transitions the EM devices 4A-L and non-EM devices 3A-M to a commissioning state. Further upon connection, the EM device 4A-L and non-EM device 3A-M authenticates the mobile device 25 and is ready to accept commands over the commissioning network 7. The lighting control devices 20A-C (e.g., wall switches or touch screen devices) suppress sleep mode until completion of the commissioning process and transition to operational mode. Lighting control devices 20A-C, which are battery powered, will re-enter sleep mode if the commissioning process is interrupted—for example, after one minute with no activity.

An installation is commissioned according to lighting control groups. A lighting control group is a collection of EM devices 4A-L and non-EM devices 3A-M sharing the same space within an installation (e.g. a room or area). Each lighting control group 8 in the installation has a special EM device 4A-L or non-EM device 3A-M called the group monitor 11. The group monitor 11 keeps tabs on the overall state and health of the EM devices 4A-L and non-EM devices 3A-M within the lighting control group 8 and assists in the communication of lighting control events between group elements. In general, one can visualize the lighting group network 8 topology as a star with the group monitor 11 as the central node and the remainder of the group's EM devices 4A-L and non-EM devices 3A-M at points of the star.

A lighting control group 8 is commissioned by first establishing the group's lighting control network 5 and then configuring the group's control behavior. The wireless lighting control network 5 is established over a 802.15.4 based MAC riding on top of a sub-GHz (904 MHz to 926 MHz) PHY. The commissioning network 7, such as a 1 GHz or above band (e.g., Bluetooth Low Energy) MAC/PHY, is used to as the point to point connection medium to transfer control network configuration from the commissioning/maintenance application 22 of the mobile device 25 to EM devices 4A-L and non-EM devices 3A-M. The commissioning/maintenance application 22 of mobile device 25 builds a lighting control group network table 237 of the group devices while establishing the lighting control network 5. The lighting control group network table 237, used by the group monitor 11 in the execution of its responsibilities, is uploaded from the mobile device 25 to the group's EM devices 4A-L and non-EM devices 3A-M via commissioning/maintenance application 22.

Each EM device 4A-L and non-EM device 3A-M also has a behavioral configuration. The configuration is specified by a group of settings that define control characteristics such as sensor set points, delays, modes, and ranges. The control characteristics also specify independent zones of control within the lighting control group 8. These characteristics and settings are customized as necessary and uploaded from the mobile device 25 to each EM device 4A-L and non-EM device 3A-M via commissioning/maintenance application 22.

During the commissioning process, line powered EM devices 4A-L and non-EM devices 3A-M are installed, powered, and advertising over BLE. Battery powered EM devices 4A-L and non-EM devices 3A-M, are installed and in sleep mode to conserve power. After the mobile device 25 is setup, an installer opens the commissioning/maintenance application 22 on the mobile device 25 and walks into an area of the installation that is ready to commission as a lighting control group 8.

Configuring a Lighting Control Group Network

EM devices 4A-L and non-EM devices 3A-M are under the command of the mobile device 25 and respond to a sequence of commands to configure a group network. The lighting control devices 20A-C (e.g., wall switches or touch screen devices) respond to a blink request by rapidly blinking a pilot light source indicator (e.g., LEDs). The pilot light source indicator 615A brightness level is set to a maximum. At any time, EM devices 4A-L and non-EM devices 3A-M cease blinking upon command. The EM devices 4A-L and non-EM devices 3A-M then accept the sub-GHz short MAC address, group number, group name, group RF channel, and personal area network (PAN) ID from the mobile device 25. The EM devices 4A-L and non-EM devices 3A-M persist this information in non-volatile memory (NVM). The EM devices 4A-L and non-EM devices 3A-M cease blinking.

The EM devices 4A-L and non-EM devices 3A-M accept the settings from the commissioning/maintenance application 22 of mobile device 25 and persist the settings in non-volatile memory. Additionally, non-EM devices 3A-M that are normal luminaires 10A-D and EM devices 4A-L that are emergency luminaires 40A-N also receive settings for an on-board controller (MCU) and on-board integrated sensors. The EM devices 4A-L and non-EM devices 3A-M and may also receive a request to execute an RF spectrum scan to determine the group RF channel. If so, the EM devices 4A-L and non-EM devices 3A-M execute the scan and return the results to the mobile device 25 for distribution to the other group devices.

The above sequence of commands issued from the commissioning/maintenance application 22 of mobile device 25 are expected to be in order. Commands received out of order are considered to be an intrusion attempt. The EM devices 4A-L and non-EM devices 3A-M configures its respective media access control (MAC) layer device circuitry and its physical layer circuitry for the OSI model (PHY) with the data transferred from the mobile device 25 and remain in a commissioning state.

Connecting a Lighting Control Group Network

To connect to the lighting control group 8 network, the EM devices 4A-L and non-EM devices 3A-M accept the lighting control group network table 237 from the mobile device 25. The lighting control group network table 237 identifies all of the EM devices 4A-L and non-EM devices 3A-M in the lighting control group 8, for example, by network address. The device persists this information in non-volatile memory. The device uses the wireless lighting control network 5 (e.g., sub-GHz network) to pass the lighting control group network table 237 to the other EM devices 4A-L and non-EM devices 3A-M in the lighting control group 8. The communication over the lighting control network 5 can be reliable-unicast and may involve some message segmenting if the table size exceeds transport protocol data unit (PDU) size.

The EM devices 4A-L and non-EM devices 3A-M return a status to the mobile device 25 indicating success or failures encountered while distributing the lighting control group network table 237. The EM devices 4A-L and non-EM devices 3A-M accept a command to tune the group RF transmission (TX) power levels and execute the tune according to the discussion below.

The commissioning/maintenance application 22 of mobile device 25 disconnects after issuing the command to tune the group RF TX power levels. The above sequence of commands issued from the mobile device 25 are expected to be in order. As noted previously, commands received out of order are considered to be an intrusion attempt. Upon completion, EM devices 4A-L and non-EM devices 3A-M in the lighting control group 8 transition to an operational state.

Radio Frequency Channel Selection

The group RF channel is determined at commissioning time by a line powered EM device 4A-L, such as normal luminaire 10A that is configured as the group monitor 11. The commissioning/maintenance application 22 of mobile device 25 requests a spectrum scan of the available channels (10) seeking the channel with the lowest average noise level measured over a short period of time.

The process is as follows. Mobile device 25 is connected to a luminaire 10A via the commissioning network 7 (e.g., BLE). The mobile device 25 requests a spectrum scan indicating the number of samples/per channel to be produced. The luminaire 10A executes a passive scan of the following channels (channel number, center frequency):

1 904 MHz
2 906 MHz
3 908 MHz
4 910 MHz
5 912 MHz
6 914 MHz
7 916 MHz
8 918 MHz
9 920 MHz
10 922 MHz
11 924 MHz
12 926 MHz

The luminaire 10A returns the average energy and peak energy detected for each channel. The commissioning/maintenance application 22 of mobile device 25 determines the optimum RF channel from the average and peak energy samples giving preference (via a weighting factor) to channels 5-8. The commissioning/maintenance application 22 of mobile device 25 commands the EM devices 4A-L and non-EM devices 3A-M to configure its MAC/PHY to use the optimum RF channel.

A modified method that replaces the above method with one that uses a discovery and link quality measurement to join the optimum gateway subnetwork may also be used. Whatever the method (gateway 50 or non-gateway), the RF channel selection scheme is timely to meet the user experience requirements for commissioning. Alternatively, this procedure may be decoupled from mobile device 25 so that channel selection can also execute independently by EM devices 4A-L and non-EM devices 3A-M.

Transmission Power Adjustment

Sub-GHz RF TX power levels are managed to optimize intra-group communications in a way that limits adverse effects (collisions, retries, corrupt packets, etc.) on adjacent group subnetworks that happen to be sharing the RF channel. The group monitor 11 executes a link test with each EM device 4A-L and non-EM device 3A-M in the lighting control group 8 as follows. The group monitor 11 sends a link test message to the EM devices 4A-L and non-EM devices 3A-M. The device returns a link test response to the group monitor indicating the received strength signal indicator (RSSI-1) of the received message in 1. The group monitor receives the response and notes the RSSI of the received message (RSSI-2). If RSSI-1 is less than the minimum RSSI-1s recorded so far, it records the new minimum RSSI.

The group monitor 11 returns a link test response acknowledgment to the device indicating RSSI-2. The device receives the acknowledgement. The device adjusts it RF TX power appropriately if the RSSI-2 does not fall within the desired range. The device returns a link test status (continue) to the group monitor 11. The device returns a link test status (complete) if the RSSI-2 is within the desired range. The group monitor 11 receives the link test status. The process repeats if the status indicates continue (is within the desired range). Steps 1 through 6 are repeated until all devices in the group have been tested. The transmission (TX) power adjustment can also be invoked for a single group monitor 11—device link. In this case, all devices in the lighting control group 8 do not need to be tested.

EM Devices and Non-EM Device Health

The group monitor 11 periodically checks the health of each EM devices 4A-L and non-EM devices 3A-M, in the lighting control group 8. The group monitor 11 runs a round robin check of each group device such that every device receives a request to report health once every hour. In an example, given a group with a maximum number of devices (128), the group monitor 11 will issue a request for health status every ~28.125 seconds while a group of six will result in a health request every 10 minutes.

Clock drift and frequency of over the air messaging are not expected to cause undesirable side effects or performance hits to the wireless lighting control network 5, however health requests are delayed via a back off timer of 10 seconds during bursts of network traffic to allow potential congestions to clear and make way for higher priority control operations.

The group monitor 11 records faults reported by EM devices 4A-L and non-EM devices 3A-M for later retrieval by commissioning/maintenance application 22 of mobile device 25 for commissioning and maintenance.

Figure 2:
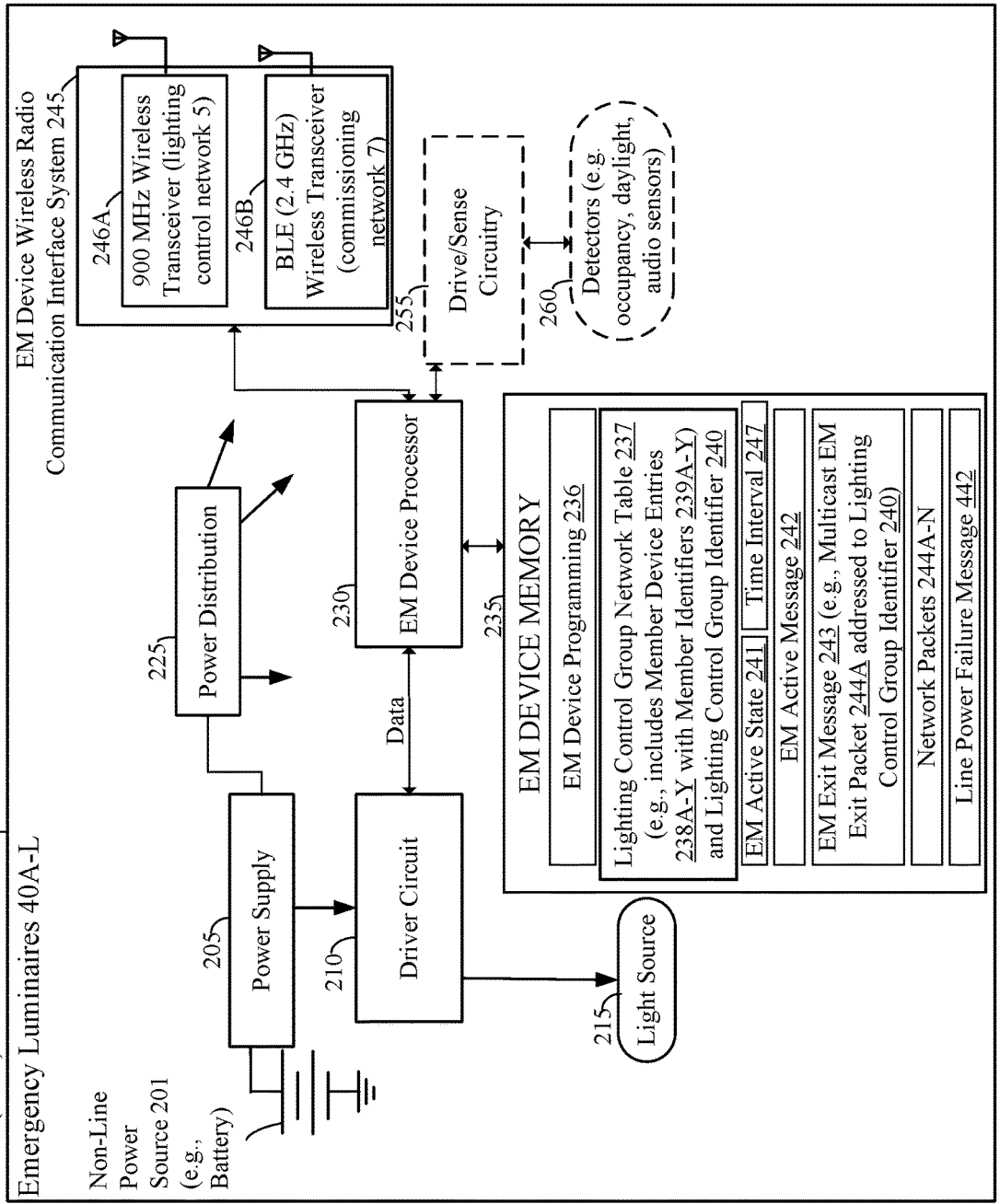
FIG. 2 is a block diagram of an EM device (e.g., emergency luminaire) that is in the lighting control group that communicates via the wireless lighting control system of FIG. 1.

FIG. 2 is a block diagram of EM devices 4A-L (e.g., emergency luminaires 40A-L) that are in the lighting control group 8 that communicates via the wireless lighting control system 1 of FIG. 1. As noted above, the lighting control system 1 includes a lighting control group 8 including a plurality of member devices 6A-Y. The member devices 6A-Y include EM devices 4A-L (e.g., including emergency luminaires 40A-L) and non-EM devices 3A-M. One of the EM devices 4A-L and non-EM devices 3A-M is designated as the group monitor 11, which is normal luminaire 10A in the example.

In FIG. 2, drive/sense circuitry 255 and detectors 200 are optionally on-board the emergency luminaire 40A-L. Detectors 260 can be infrared sensors for occupancy or motion detection, an in-fixture daylight sensor, an audio sensor, a temperature sensor, or other environmental sensor. Drive/sense circuitry 255, such as application firmware, drives the occupancy, audio, and photo sensor hardware.

Emergency luminaire 40A-L includes a power supply 205 that is driven by a non-line power source 201 and optionally line power source 201. Non-line power source 201 in the example is a battery, solar panel, or any other AC or DC source (e.g. a generator) that is not line powered. A line power source 301 as will be referenced in FIGS. 3-7B, is referred to as grid power, wall power, and domestic power, alternating current (AC) electric power produced and delivered via AC mains to homes and businesses. Line power source 301 is the form of electrical power that consumers use when they plug in domestic appliances, televisions and electric lamps into wall outlets. Line power source 301 conveys line power, sometimes referred to as "household power," "household electricity," "house current," "powerline," "domestic power," "wall power," "line power," "AC power", "city power," "street power" that is produced by an electric utility provider.

Power supply 205 may include a magnetic transformer, electronic transformer, switching converter, rectifier, or any other similar type of circuit to convert an input power signal into a power signal suitable for light source 215. In the case of emergency luminaire 40A-L, the light source 215 is configured to continuously emit emergency illumination lighting during an emergency.

Light source 215 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 215 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Emergency luminaire 40A-L further includes, a driver circuit 210, for example, an intelligent light emitting diode (LED) driver circuit. Driver circuit 210 is coupled to light source 215 and drives that EM device light source 215 by regulating the power to EM device light source 215 by providing a constant quantity or power to EM device light source 215 as its electrical properties change with temperature, for example. The driver circuit 210 provides power to light source 215. Driver circuit 210 may be a constant-voltage driver, constant-current driver, or AC LED driver type circuit that provides dimming through a pulse width modulation circuit and may have many channels for separate control of different LEDs or LED arrays that comprise light source 215. An example of a commercially available intelligent LED driver circuit 210 is manufactured by EldoLED®. In the case of emergency luminaire 40, the driver circuit 210 is coupled to the emergency luminaire light source 215 to control light source operation of the emergency luminaire light source 215.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the light source 215 that may include a DC offset, such that its average value is nonzero, and/or an AC voltage.

For purposes of communication and control, emergency luminaire 40A-L is treated as a single or a multi-addressable device that can be configured to operate as a member of the wireless lighting control network 5. Emergency luminaire 40A-L includes power distribution circuitry 225 driven by the non-line power source 201, an EM device processor 230, and an EM device memory 235. As shown, EM device processor 230 is coupled to wireless radio communication interface system 245 and driver circuit 210. EM device processor 230 includes a central processing unit (CPU) that controls the light source operation of the light source 215.

Figure 3:
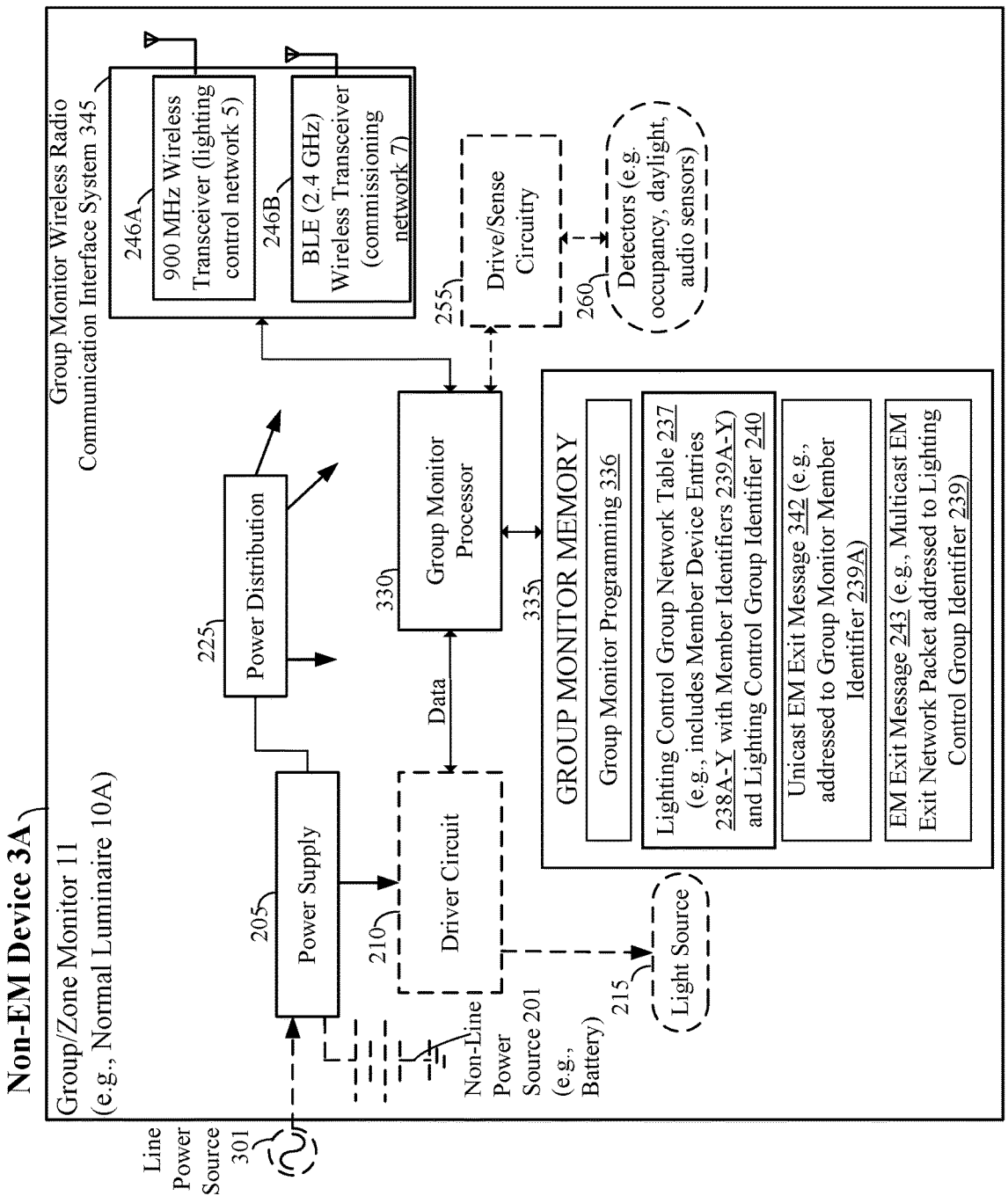
FIG. 3 is a block diagram of a non-EM device configured as a group/zone monitor of the lighting control group that communicates via the wireless lighting control system of FIG. 1.

EM device memory 235 of FIG. 2, group monitor memory 335 of FIG. 3, and non-EM device 435 of FIGS. 4-7B can include volatile and non-volatile storage.

The power distribution circuitry 225 distributes power and ground voltages to the EM device processor 230, EM device memory 235, and an EM device wireless radio communication interface system 245 (e.g., wireless transceivers), drive/sense circuitry 255, and detector(s) 260 to provide reliable operation of the various circuitry on the emergency luminaire 40.

EM device wireless radio communication interface system 245 of FIG. 2, group monitor wireless radio communication interface system 345 of FIG. 3, and non-EM device wireless radio communication interface system 445 of FIGS. 4-7B allow for data communication (e.g., wired or wireless) over various networks, including the wireless lighting control network 5 and the wireless commissioning network 7. Wireless radio communication interface system 245, 345, 445 includes at least one transceiver, for example, a one band, dual-band, or tri-band chipset of wireless transceiver(s) 246A-B configured for wireless communication via separate radios that operate at three different frequencies, such as sub-GHz (e.g., 900 MHz), Bluetooth Low Energy (BLE) (2.4 GHz), and 5 GHz, for example. For example, wireless radio communication interface system 245, 345, 445 includes a first transceiver 246A configured for wireless communication (e.g., unicast and multicast) via a wireless lighting control network 5 over a first wireless lighting control network communication band (e.g., sub-GHz) for lighting control and systems operations (or information) with member devices 6B-Y (e.g., EM devices 4B-N and non-EM devices 3A-M) of the lighting control group 8. Wireless radio communication interface system 245, 345, 445 can include a second wireless transceiver 246B for communication (e.g., point-to-point) via the wireless commissioning network 7 with the mobile device 25 for commissioning, over a second different wireless commissioning network communication band (e.g., 1 GHz or above), of commissioning, configuration or maintenance operations (or information) other than the control and systems operations (or information).

EM device processor 230 of the emergency luminaire 40 of FIG. 2, group monitor processor 330 of group/zone monitor 11 of FIG. 3, and non-EM device processor 430 of non-EM devices 10B-M of FIGS. 4-7B, serve to perform various operations, for example, in accordance with instructions or programming executable by processors 230, 330, 430. For example, such operations may include operations related to communications with various lighting control system 1 elements, such as EM devices 4A-L and non-EM devices 3A-M during the automatic emergency mode exit network protocol procedure described herein. Although a processor 230, 330, 430 may be configured by use of hardwired logic, typical processors are general processing circuits configured by execution of programming. Processors 230, 330, 430 include elements structured and arranged to perform one or more processing functions, typically various data processing functions. Although discrete logic components could be used, the examples utilize components forming a programmable CPU. A processor 230, 330, 430 for example includes one or more integrated circuit (IC) chips incorporating the electronic elements to perform the functions of the CPU. The processors 230, 330, 430 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in EM devices 4A-L, group monitor 11, and non-EM devices 3A-M.

EM device memory 235 of the EM devices 4A-L of FIG. 2, group monitor memory 335 of group/zone monitor 11 of FIG. 3, and non-EM device memory 435 of non-EM devices 3B-M of FIGS. 4-7B, are for storing data and programming. In the example, the main memory system 235, 335, 435 may include a flash memory (non-volatile or persistent storage) and a random access memory (RAM) (volatile storage). The RAM serves as short term storage for instructions and data being handled by the processors 230, 330, 430, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with EM devices 4A-L and non-EM devices 3A-M. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 235, 335, 435 or a memory of a computer used to download or otherwise install such programming into the EM devices 4A-L and non-EM devices 3A-M, or a transportable storage device or a communications medium for carrying program for installation in the EM devices 4A-L and non-EM devices 3A-M.

As shown, the emergency luminaire 40A-L includes EM device programming 236 (e.g., emergency luminaire programming) in the memory 235, which configures the processor 230 to control operations of the light source 2015, including the communications over the wireless radio communication interface system 245. The EM device programming 236 implements the automatic emergency mode exit network protocol 900 of FIG. 9. The EM device memory 235 also stores a lighting control group table 237 listing a respective member device entry 238A-Y with a respective member identifier 239A-Y for each of the member devices 6A-Y (twelve EM devices 4A-L and thirteen EM devices 3A-M) to establish the lighting control group 8 that communicates over the wireless lighting control network 5. Each member identifier 239A-Y is a unique numeric (or alphanumeric) identifier, such as a network address, of the member device 6A-Y. Member identifier 239A-Y is unique per lighting control group 8.

The EM device memory 235 further comprises an EM active estate 241, which is a setting, such as a flag or device setting to indicate the EM active state 241 is active (entered) or inactive (exited). EM device memory 235 further includes various network messages, such as an EM active state message 242, EM exit message 243, and line power failure message 442, which are sent or received as network packets 244A-N over the wireless lighting control network 5. For example, the EM exit message 243 is a multicast EM exit network packet 244A addressed to the lighting control group identifier 240.

EM device programming 236 of FIG. 2, group monitor programming 336 of FIG. 3, and non-EM device programming 436 of FIGS. 4-7B is firmware/software that engages in communications with the member devices 6A-Y in the lighting control group 8 of the wireless lighting control system 1, including non-EM devices 3A-M and EM devices 4A-L to implement the emergency mode exit network protocol for EM devices 4A-L. EM device programming 236 of FIG. 2, group monitor programming 336 of FIG. 3, and non-EM device programming of FIGS. 4-7B can also operate the driver circuit 210 to control light source 215, pilot light source indicator 615A, touch screen 615B; operate drive/sense circuitry 255 to control detectors 260 and switches 261; and engage in network communications within the lighting control system 1.

Execution of the EM device programming 236 by the EM device 4A-L (e.g., emergency luminaire 40A-L) configures the EM device 4A-L to implement the following functions. First, determine that a line power source 301 for powering on a subset or all of the member devices 6A-Y is interrupted such that line power is no longer available via the line power source 301. In response to determining that the line power source 301 for the subset or all of the member devices 6A-Y is interrupted, enter an emergency mode (EM) active state 241 by controlling the emergency luminaire light source 215, via the emergency luminaire driver circuit 210, to continuously emit the emergency illumination lighting. Second, upon entering the EM active state 241, transmit, via the wireless lighting control network 5, an EM active message 242 to the lighting control group 8 repeatedly at a predetermined time interval 247 (e.g., every 30 seconds). Third, receive, via the wireless lighting control network 5, an EM exit message 243 from another member device 4B-L, 3A-M indicating to exit the EM active state 241. Fourth, in response to receiving the EM exit message 243 from the other member device 4B-L, 3A-M, exit the EM active state 231 by controlling the emergency luminaire light source 215, via the emergency luminaire driver circuit 210, to discontinue emitting the emergency illumination lighting.

In an example, the EM active message 242 is received, via the lighting control network 5, as a multicast EM active packet 244A or a broadcast EM active packet 244B. The other member device is the group monitor 11. More specifically, execution of the EM device programming 236 by the EM device processor 230 configures the EM device 4A-L to implement the following functions. First, listen, via the wireless lighting control network 5, for network packets 244A-N addressed to the lighting control group identifier 240 (e.g., network address) of the lighting control group 8. Second, in response to receiving the multicast EM exit network packet 244A addressed to the lighting control group identifier 240, from the group monitor 11, exit the EM active state 241.

In another example, execution of the EM device programming 236 by the EM device processor 230 configures the EM device 4A-L to implement functions, including functions to during commissioning of the EM device 4A-L, via the wireless commissioning network 5 by the mobile device 25, upon entering the EM active state 241, exit the EM active state 241.

FIG. 3 is a block diagram of a non-EM device 3A (e.g., normal luminaire 10A) configured as a group/zone monitor 11 of the lighting control group 8 that communicates via the wireless lighting control system 1 of FIG. 1. Any of the EM devices 4A-L and non-EM devices 3A-M can be configured as the group monitor 11. Hence, the circuitry, hardware, and software of the group monitor 11 shown is similar to the emergency luminaires 40A-L and non-EM devices 4A-M. However, as shown, group monitor 11 can include a subset of the circuitry, hardware, and software shown for the emergency luminaire 40A-L of FIG. 2. Group monitor 11 includes a power supply 205, which is powered by a line power source 301 or a non-line power source 201, depending on whether the group monitor is a non-EM device 3A-M or EM device 4A-L. The power supply 205 of the group monitor 11 can be powered by the line power source 301, the non-line power source 201, or both. Group monitor 11 includes a group monitor wireless radio communication interface system 345 including at least one transceiver 246A-B configured for wireless communication via the wireless lighting control network 5 over the wireless lighting control network communication band for lighting control and systems operations like element 245 of FIG. 2. Group monitor 11 can optionally include driver circuit 210, light source 215, drive/sense circuitry 255, and detectors 260 like that of FIG. 2.

Group monitor 11 includes a group monitor processor 330 coupled to the group monitor wireless radio communication interface system 345 and a group monitor memory 335 accessible to the group monitor processor 330. Group monitor 11 includes group monitor programming 336 in the group monitor memory 335.

The group monitor memory 335 also stores a lighting control group table 237 listing a respective member device entry 238A-Y with a respective member identifier 239A-Y for each of the member devices 6A-Y (twelve EM devices 4A-L and thirteen EM devices 3A-M) to establish the lighting control group 8 that communicates over the wireless lighting control network 5. Each member identifier 239A-Y is a unique numeric (or alphanumeric) identifier, such as a network address, of the member device 6A-Y. Member identifier 239A-Y is unique per lighting control group 8.

The group monitor memory 335 further comprises a unicast EM exit message 342 (e.g., addressed to group monitor member identifier 239A). EM device memory 235 further includes an EM exit message 243, for example, the EM exit message 243 is a multicast EM exit network packet 244A addressed to the lighting control group identifier 240.

Execution of the group monitor programming 336 by the group monitor processor 330 configures the group monitor 11 to implement functions, including functions to transmit, via the wireless lighting control network 5, the EM exit message 243 to the emergency luminaire 40A-L. In one example, execution of the group monitor programming 336 by the group monitor processor 330 configures the group monitor 11 to receive, via the wireless lighting control network 5, a unicast EM exit message 342 from the non-EM device 3B-M; and in response to receiving the unicast EM exit message 342 from the non-EM device 3B-M, transmit, via the wireless lighting control network 5, to the emergency luminaire 40A-L the EM exit message 243 indicating to exit the EM active state 241. The EM exit message 243 is transmitted from the group monitor 11, via the wireless lighting control network 5, to the member devices 6A-Y of the lighting control group 8 as a multicast EM exit network packet 244A. The multicast EM exit network packet 244A is addressed to the lighting control group identifier 240, which uniquely identifies the lighting control group 8.

Figure 4:
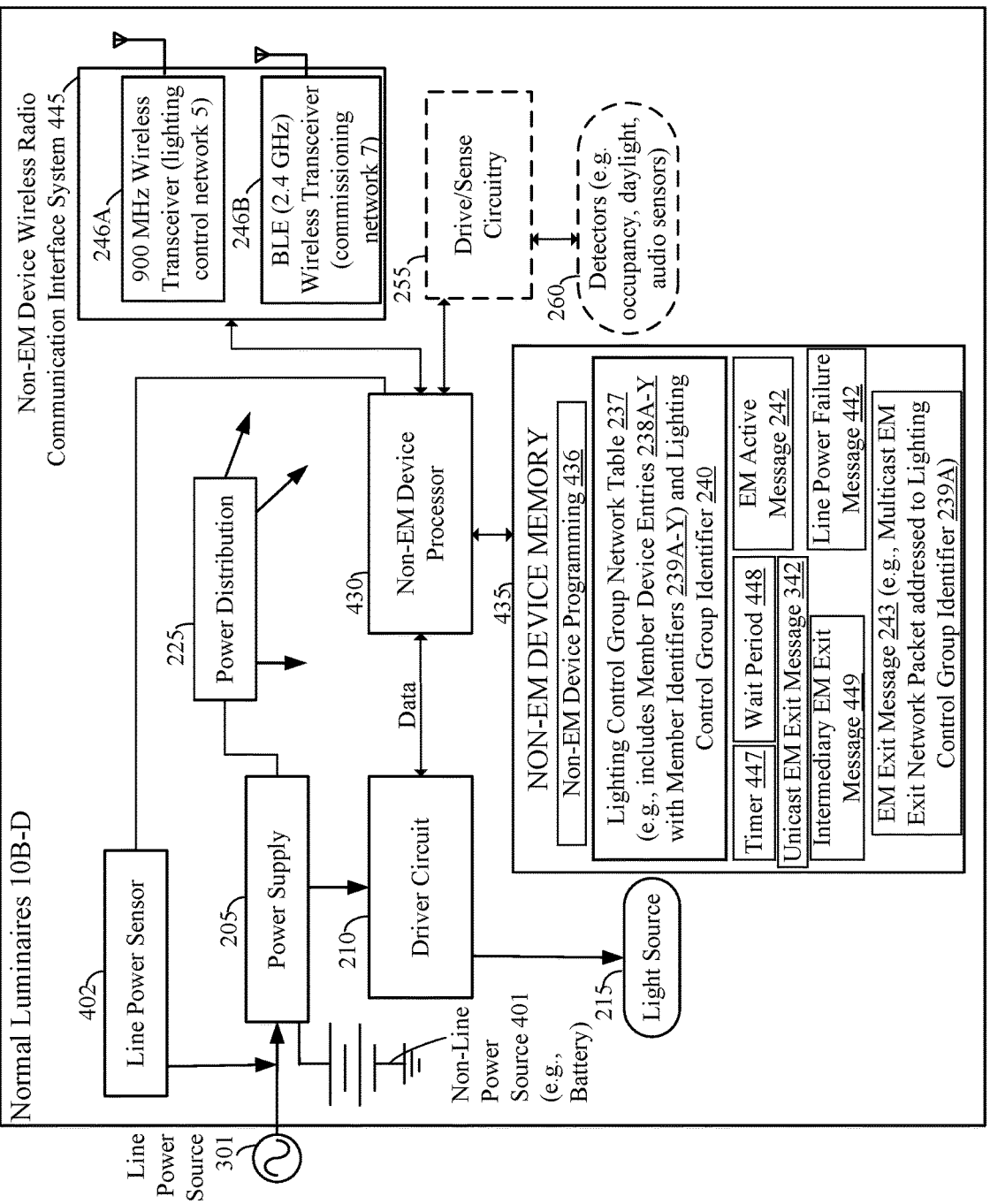
FIG. 4 is a block diagram of non-EM devices (e.g., normal luminaires) of the lighting control group that communicate via the wireless lighting control system of FIG. 1.

FIG. 4 is a block diagram of non-EM devices 3B-D (e.g., normal luminaires 10B-D) of the lighting control group 8 that communicate via the wireless lighting control system 1 of FIG. 1. The circuitry, hardware, and software of the non-EM devices 3B-D shown is similar to the emergency luminaires 40A-L of FIG. 2. However, as shown, normal luminaires 10B-D include a power supply 205, which is powered by a line power source 301. Normal luminaires 10B-D can optionally include another non-line power source 401 to drive the power supply 205.

Normal luminaires 10B-D also include a line power sensor 402. Normal luminaires 10B-D include a non-EM device wireless radio communication interface system 445 including at least one transceiver 246A-B configured for wireless communication via the wireless lighting control network 5 over the wireless lighting control network communication band for lighting control and systems operations like element 245 of FIG. 2. Non-EM devices 3B-D can optionally include driver circuit 210, light source 215, drive/sense circuitry 255, and detectors 260 like that of FIG. 2.

Normal luminaires 10B-D include a non-EM device processor 430 coupled to the non-EM device wireless radio communication interface system 445 and a non-EM device memory 435 accessible to the non-EM device processor 430. Normal luminaires 10B-D include non-EM device programming 436 in the non-EM device memory 435.

As noted above, normal luminaires 10B-D are just one example of a non-EM device 3A-M, of which several types are described in FIGS. 4-7B. Non-EM device memory 435 also stores a lighting control group table 237 listing a respective member device entry 238A-Y with a respective member identifier 239A-Y for each of the member devices 6A-Y (twelve EM devices 4A-L and thirteen EM devices 3A-M) to establish the lighting control group 8 that communicates over the wireless lighting control network 5. Each member identifier 239A-Y is a unique numeric (or alphanumeric) identifier, such as a network address, of the member device 6A-Y. Member identifier 239A-Y is unique per lighting control group 8. Non-EM device memory 435 also stores a lighting control group identifier 240.

Non-EM device memory 435 further comprises a unicast EM exit message 342 (e.g., addressed to group monitor member identifier 239A). Non-EM device memory 435 further includes an EM exit message 243, for example, the EM exit message 243 is a multicast EM exit network packet 244A addressed to the lighting control group identifier 240. Non-EM device 435 further includes a timer 447, a predetermined wait period 448, an EM active message 242, an intermediary EM exit message 449, and a line power failure message 442.

Execution of the non-EM device programming 436 by the non-EM device processor 430 configures the non-EM device 3B-M to implement the following functions. First, after being powered on by the line power source 301, receive, via the wireless lighting control network 5, the EM active message 242. Second, in response to receiving the EM active message 242, initiate a timer 447 for a predetermined wait period 448 (e.g., 45 seconds). Third, upon expiry of the predetermined wait period 448, non-EM device 3B-M transmits an intermediary EM exit message 449 to the group monitor 11. The intermediary EM exit message 449 is transmitted, via the lighting control network 5, to the group monitor 11 as a unicast network packet.

Execution of the non-EM device programming 436 by the non-EM device processor 430 configures the non-EM device 3B-M to detect that the intermediary EM exit message 449 transmitted to the group monitor 11 failed to successfully send to the group monitor 11. In response to detecting that the intermediary EM exit message 449 failed to successfully send to the group monitor 11, the non-EM device 3B-D transmits, via the wireless lighting control network 5, the EM exit message 243 to the emergency luminaire 40A-L.

Alternatively, in response to receiving, via the wireless lighting control network 5, the EM exit message 243 before expiry of the predetermined wait period 448, non-EM device 3B-M restarts the timer 447 and halts transmission of an intermediary EM exit message 449 to the group monitor 11.

Line power sensor 402 is for detecting interruption of line powered conveyed from the line power source 301. Line power sensor 402 can be a wired or wireless power line sensor that includes a housing and is electrically connectable to a power distribution line (electrical wire). The line power sensor 402 is coupled to a conductive power line between the line power source 301 and power supply 202, takes analog voltage/current measurements and sends the analog voltage/current measurements to the non-EM device processor 430. Alternatively, the analog voltage/current measurements may be converted by a digital-to-analog converter (DAC) into digital voltage/current measurements and then sent to the non-EM device processor 430. Alternatively, the line power sensor 402 can be a non-contact sensor within an insulator to determine the electrical and mechanical status of the utility power distribution line (line power source 301), which sends a digital status (interrupted or available) to the non-EM device processor 430 to indicate the line power source 301 is active.

Execution of the non-EM device programming 436 by the non-EM device processor 430 configures the non-EM device 3B-M to implement the following functions. First, sense, via the line power sensor 402, whether line power conveyed from the line power source 301 is interrupted or available. Second, in response to sensing, via the line power sensor 402, that line power conveyed from the line power source 301 is interrupted, transmit, via the wireless lighting control network 5, a line power failure message 442 indicating that line power is interrupted to the member devices 6A-Y of the lighting control group 8. Execution of the EM device programming 236 by the EM device processor 230 configures the EM device 4A-L to determine that the line power for powering on a subset or all of the member devices 6A-Y is interrupted in response to receiving the line power failure message 442 and responsively enter the EM active state 241.

Alternatively, execution of the non-EM device programming 436 by the non-EM device processor 430 configures the non-EM device 3B-M to implement functions to in response to sensing, via the line power sensor 402, that the line power source 301 is available, transmit, via the wireless lighting control network 5, the EM exit message 243 indicating to exit the EM active state 241.

Figure 5:
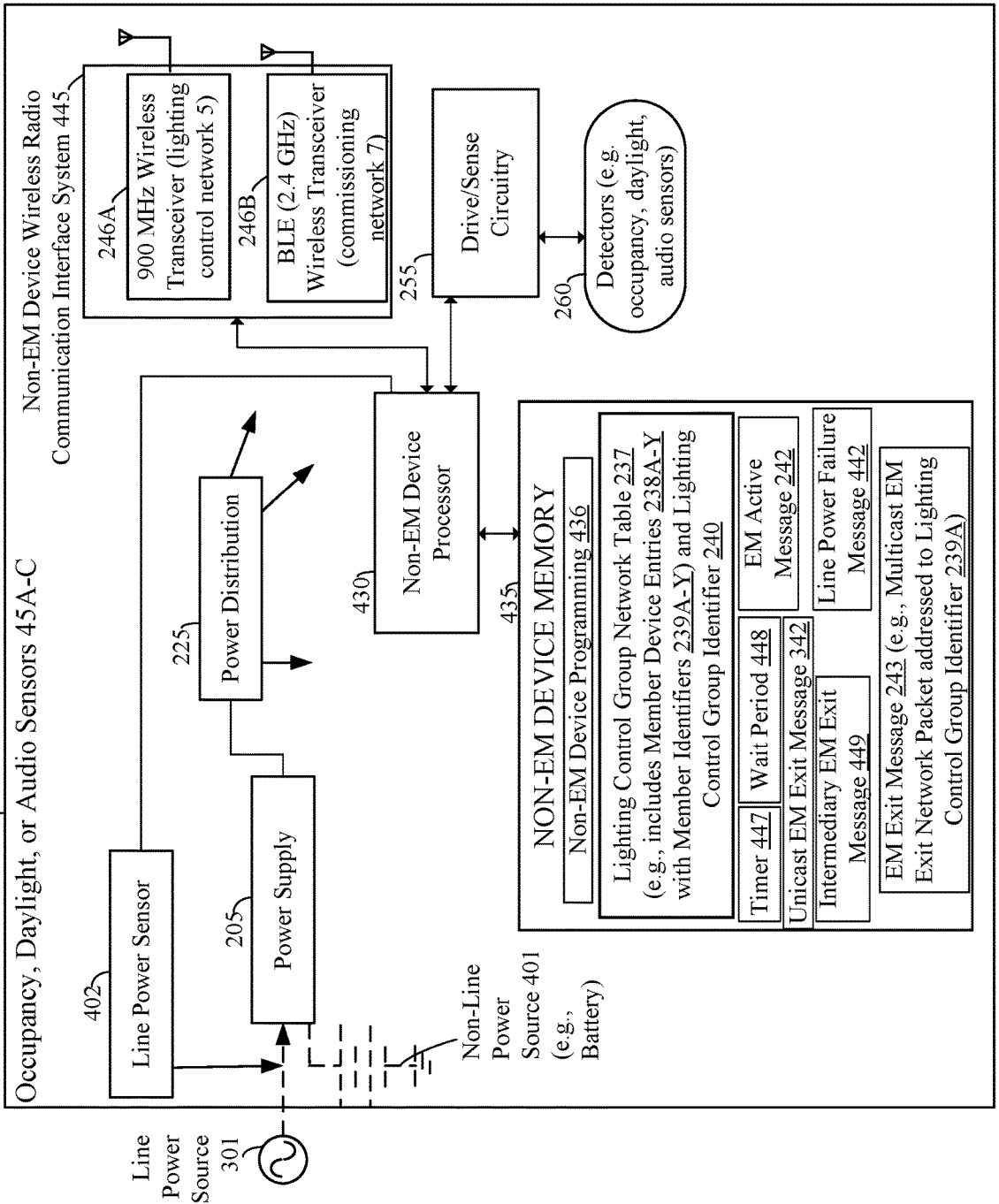
FIG. 5 is a block diagram of non-EM devices (e.g., occupancy, daylight, or audio sensors) of the lighting control group that communicate via the wireless lighting control system of FIG. 1.

FIG. 5 is a block diagram of non-EM devices 3E-G (e.g., occupancy, daylight, or audio sensors 45A-C) of the lighting control group 8 that communicate via the wireless lighting control system 1 of FIG. 1. The circuitry, hardware, and software of the occupancy, daylight, or audio sensors 45A-C shown are similar to the normal luminaires 10B-D of FIG. 4, including the non-EM device memory 435, to implement the automatic emergency mode exit network protocol described herein. Hence, non-EM device memory 435 is shown as including non-EM device programming 436, a lighting control group table 237, and a lighting control group identifier 240. The non-EM device memory 435 further comprises a unicast EM exit message 342 (e.g., addressed to group monitor member identifier 239A). Non-EM device memory 435 further includes an EM exit message 243, for example, the EM exit message 243 is a multicast EM exit network packet 244A addressed to the lighting control group identifier 240. Non-EM device 435 further includes a timer 447, a predetermined wait period 448, an EM active message 242, an intermediary EM exit message 449, and a line power failure message 442.

Figure 6A:
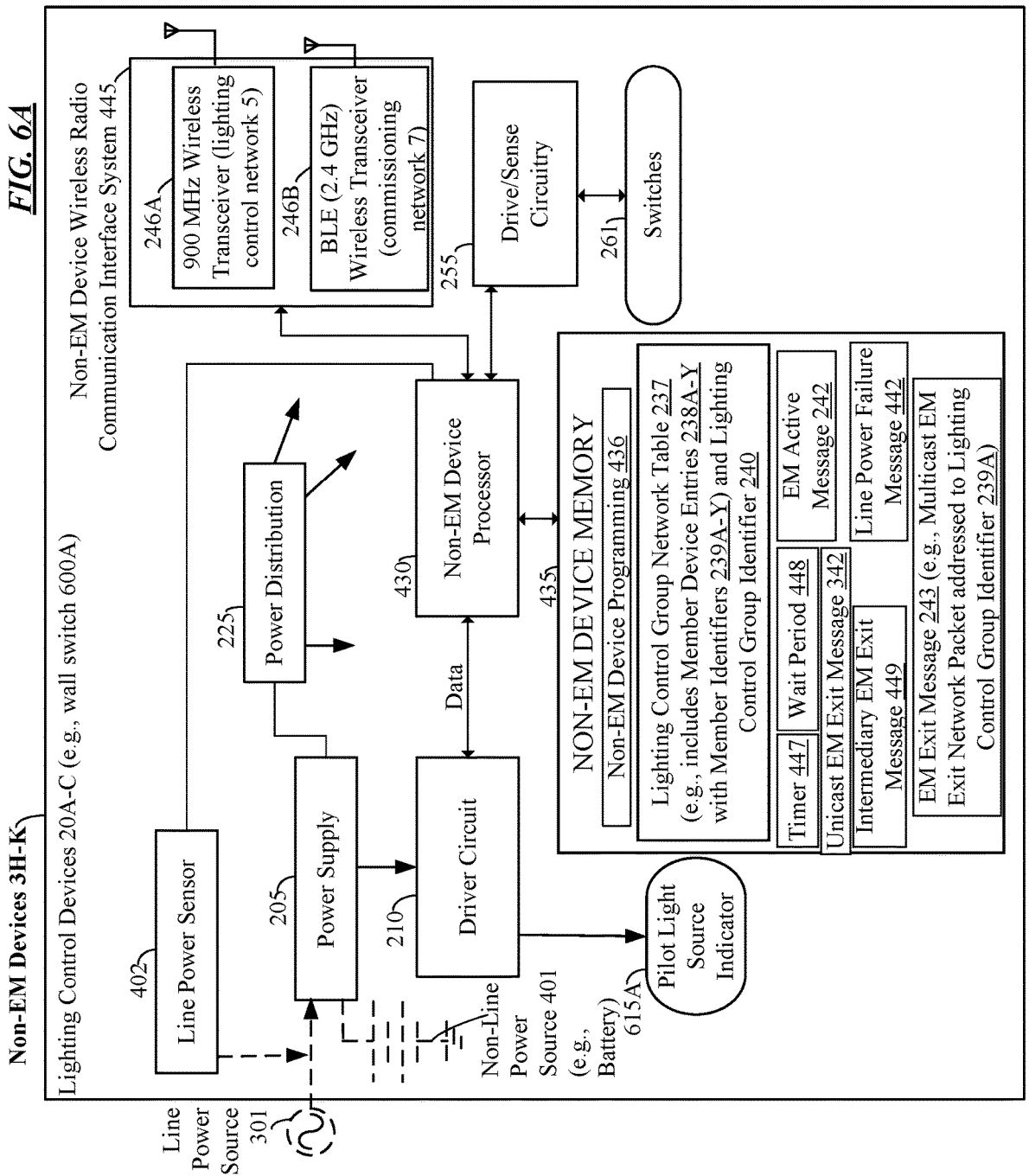

FIGS. 6A-B are block diagrams of non-EM devices 3H-K (e.g., lighting control devices 20A-C), specifically a wall switch 600A and a touch screen device 600B, of the lighting control group 8 that communicate via the wireless lighting control system of FIG. 1. The circuitry, hardware, and software of the lighting control devices 20A-C shown are similar to the normal luminaires 10B-D of FIG. 4, including the non-EM device memory 435, to implement the automatic emergency mode exit network protocol described herein. Hence, non-EM device memory 435 is shown as including non-EM device programming 436, a lighting control group table 237, and a lighting control group identifier 240. The non-EM device memory 435 further comprises a unicast EM exit message 342 (e.g., addressed to group monitor member identifier 239A). Non-EM device memory 435 further includes an EM exit message 243, for example, the EM exit message 243 is a multicast EM exit network packet 244A addressed to the lighting control group identifier 240. Non-EM device 435 further includes a timer 447, a predetermined wait period 448, an EM active message 242, an intermediary EM exit message 449, and a line power failure message 442.

However, as shown, wall switch 600A and touchscreen device 600B can include a subset of the circuitry, hardware, and software shown for the luminaires 10B-D of FIG. 4.

As shown in FIG. 6A, non-EM devices 3H-K can be a wall switch 600A where the drive/sense circuitry 255 responds to switches 261. Switches 261 can be an on/off switch, dimmer switch, or set scene switch based on Acuity Brands Lighting's commercially available xPoint® Wireless ES7 product. In our some examples, wall switch 600A includes a single shared button switch 261 for on/off, dimming, or set scene functions and a pilot light source indicator 615A of wall switch 600A. A button station can include various button settings that can have the lighting control settings adjusted, for example, four buttons can be arranged with two longitudinal buttons (north-south) and two lateral buttons (east-west).

In FIG. 6B, non-EM devices 3H-K can be a touchscreen device 600B where lighting control setting adjustments are inputted via a user interface application (not shown) through manipulation or gestures on a touch screen 615B. For output purposes, the touch screen 615B includes a display screen, such as a liquid crystal display (LCD) or light emitting diode (LED) screen or the like. For input purposes, touch screen 615B includes a plurality of touch sensors.

A keypad may be implemented in hardware as a physical keyboard of touch screen device 600B, and keys may correspond to hardware keys of such a keyboard. Alternatively, some or all of the keys (and keyboard) of touchscreen device 600B may be implemented as "soft keys" of a virtual keyboard graphically represented in an appropriate arrangement via touch screen 615B. The soft keys presented on the touch screen 615B may allow the user of touchscreen device 600B to invoke the same user interface functions as with the physical hardware keys.

Optionally drive/sense circuitry 255 is coupled to touch sensors of touch screen 615B for detecting the occurrence and relative location/position of each touch with respect to a content display area of touch screen 615B. In this example, drive/sense circuitry 255 is configured to provide non-EM device processor 430 with touch-position information based on user input received via touch sensors. In some implementations, non-EM device processor 430 is configured to correlate the touch position information to specific content being displayed within the content display area on touch screen 615B. The touch-position information captured by the drive/sense circuitry 255 and provided to non-EM device processor 430 may include, but is not limited to, coordinates identifying the location of each detected touch with respect to the display area of touch screen 615B and a timestamp corresponding to each detected touch position.

In general, touch screen 615B and its touch sensors (and one or more keys, if included) are used to provide a textual and graphical user interface for the touchscreen device 600B. In an example, touch screen 615B provides viewable content to the user at lighting control device 10. Touch screen 615B also enables the user to interact directly with the viewable content provided in the content display area, typically by touching the surface of the screen with a finger or an implement such as a stylus.

Figure 7A:
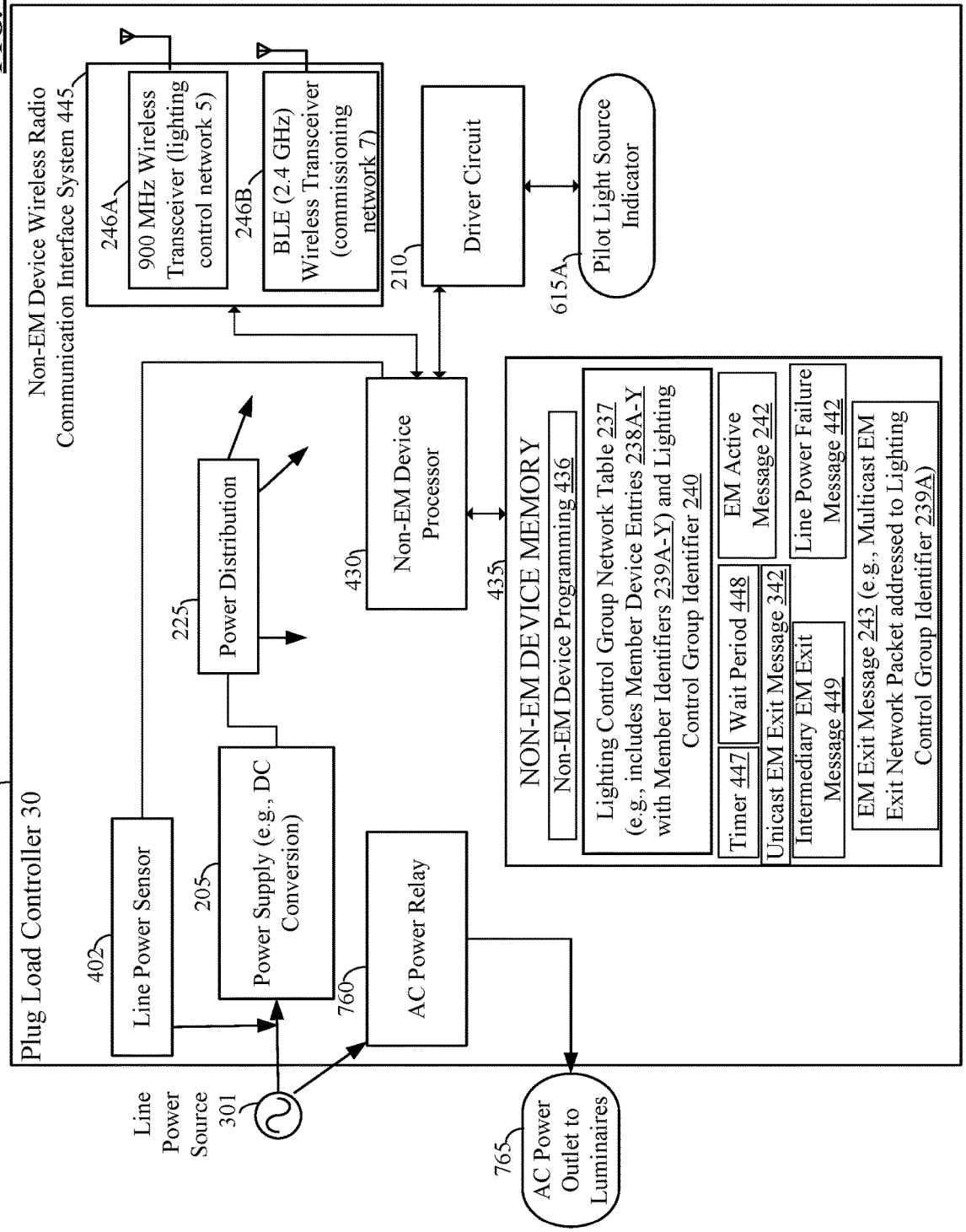
FIG. 7A is a block diagram of a non-EM device, specifically a plug load controller, of the lighting control group that communicates via the wireless lighting control system of FIG. 1.

FIG. 7A is a block diagram of a non-EM device 3L, specifically a plug load controller 30, of the lighting control group 8 that communicates via the wireless lighting control system 1 of FIG. 1. The circuitry, hardware, and software of the plug load controller 30 shown are similar to the normal luminaires 10B-D of FIG. 4, including the non-EM device memory 435, to implement the automatic emergency mode exit network protocol described herein. Hence, non-EM device memory 435 is shown as including non-EM device programming 436, a lighting control group table 237, and a lighting control group identifier 240. The non-EM device memory 435 further comprises a unicast EM exit message 342 (e.g., addressed to group monitor member identifier 239A). Non-EM device memory 435 further includes an EM exit message 243, for example, the EM exit message 243 is a multicast EM exit network packet 244A addressed to the lighting control group identifier 240. Non-EM device 435 further includes a timer 447, a predetermined wait period 448, an EM active message 242, an intermediary EM exit message 449, and a line power failure message 442.

However, plug load controller 30 is a retrofit device that plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning and maintenance operations and processes wireless lighting controls in order to the allow the lighting device to operate in the lighting control system 1. As shown, plug load controller 30 includes a power supply 205 (e.g., including DC conversion circuit) driven by line power source 301, in our example, an AC line or mains.

DC conversion circuit of the power supply 205 receives power from the line power source 301, and may include a magnetic transformer, electronic transformer, switching converter, rectifier, or any other similar type of circuit to convert an input power signal into a suitable power signal to power itself. Plug load controller 30 further comprises an AC power relay 760, which relays incoming AC power from line power source 301 to other devices that may plug into the receptacle of plug load controller 30 thus providing AC power via an AC power outlet 765 to luminaires 10B-D.

Plug load controller 30 may optionally include a driver circuit 210 to drive the pilot light source indicator 615A that indicates the state of the plug load controller 30, for example, during commissioning and maintenance procedures.

Figure 7B:
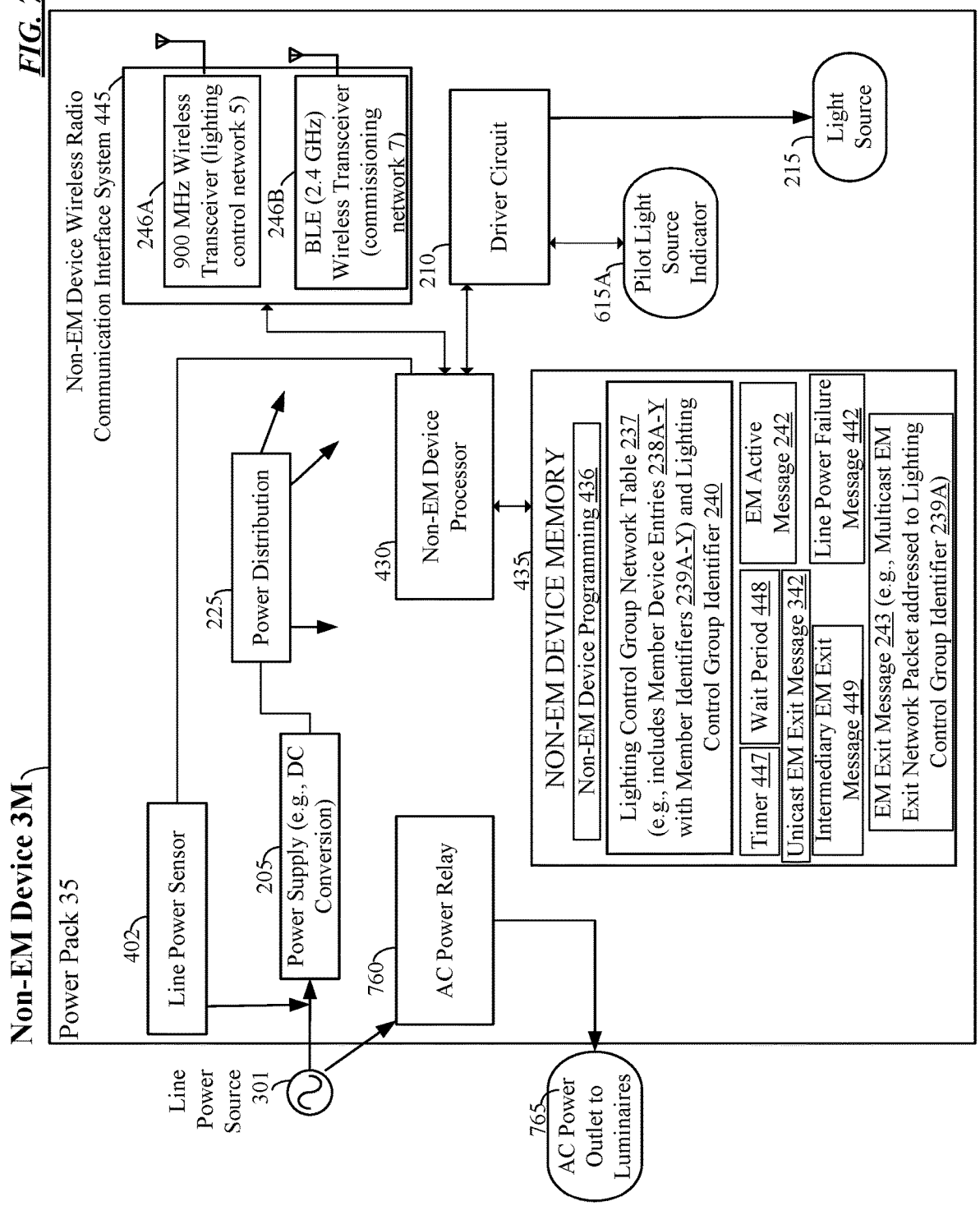
FIG. 7B is a block diagram of a non-EM device, specifically a power pack, of the lighting control group that communicates via the wireless lighting control system of FIG. 1

FIG. 7B is a block diagram of non-EM device 3M, specifically a power pack 35, of the lighting control group 8 that communicates via the wireless lighting control system 1 of FIG. 1. The circuitry, hardware, and software of the plug load controller 35 shown are similar to the normal luminaires 10B-D of FIG. 4 and plug load controller 30 of FIG. 7A, including the non-EM device memory 435, to implement the automatic emergency mode exit network protocol described herein. Hence, non-EM device memory 435 is shown as including non-EM device programming 436, a lighting control group table 237, and a lighting control group identifier 240. The non-EM device memory 435 further comprises a unicast EM exit message 342 (e.g., addressed to group monitor member identifier 239A). Non-EM device memory 435 further includes an EM exit message 243, for example, the EM exit message 243 is a multicast EM exit network packet 244A addressed to the lighting control group identifier 240. Non-EM device 435 further includes a timer 447, a predetermined wait period 448, an EM active message 242, an intermediary EM exit message 449, and a line power failure message 442. However, power pack 35 is a device that retrofits with existing wired light fixtures (luminaires). The power pack 35 instantiates the wired luminaires 10B-D by allowing for commissioning and maintenance operations and processes wireless lighting controls in order to allow the lighting device to operate in the lighting control system 1.

Figure 8:
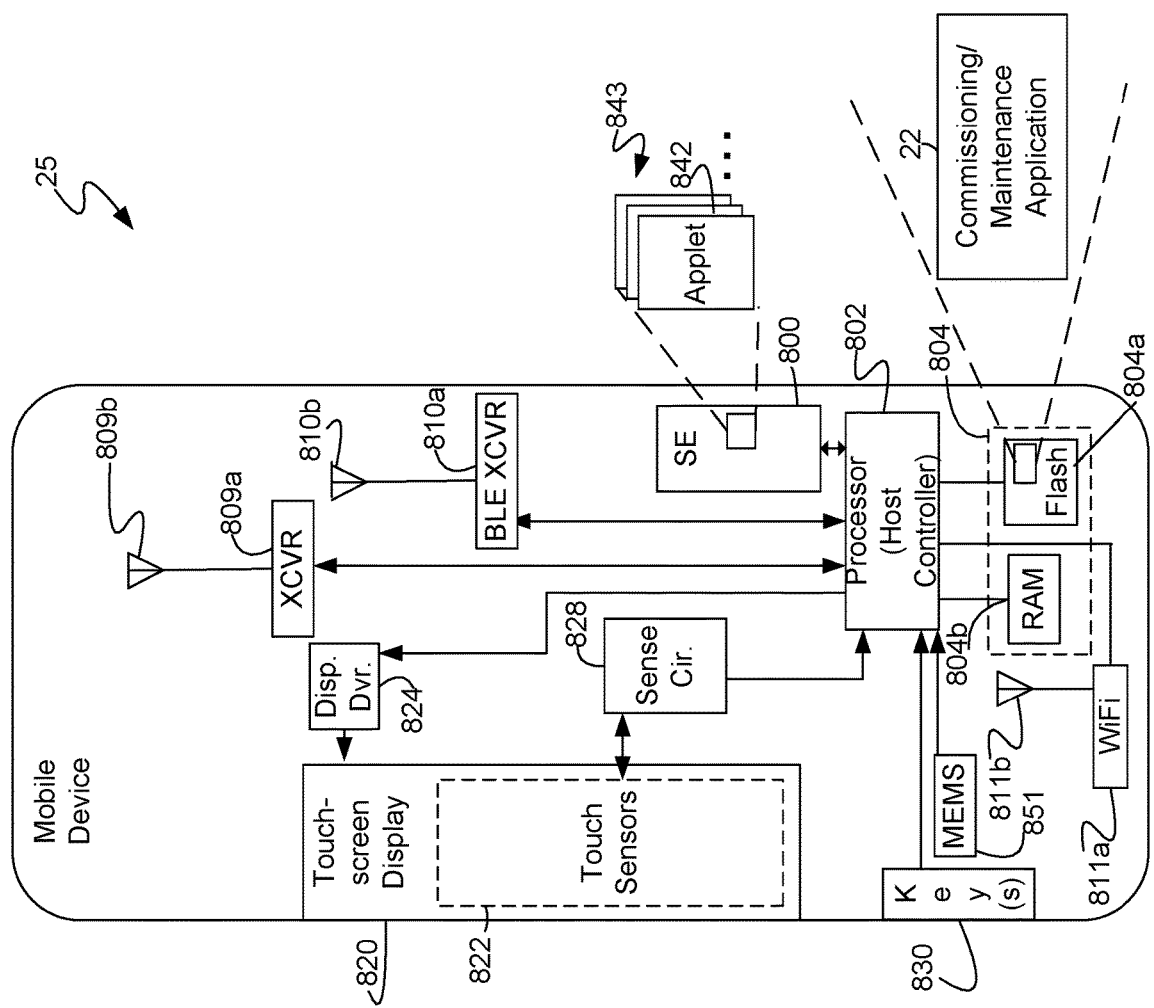
FIG. 8 is a high-level functional block diagram of a mobile device for commissioning and maintenance of the wireless lighting control system of FIG. 1 that communicates via a commissioning network of FIG. 1.

FIG. 8 is a high-level functional block diagram of a mobile device 25 for commissioning and maintenance of the wireless lighting control system 1 of FIG. 1 that communicates via the commissioning network 7 of FIG. 1. The mobile device 25 and associated elements are corresponding to the reference numerals are described in column 23, line 60 to column 26, line 13 of U.S. Pat. No. 9,820,361, issued on Nov. 14, 2019, titled "Wireless Lighting Control System," to applicant ABL IP Holding, LLC, which is incorporated by reference as if fully set forth herein.

Figure 9:
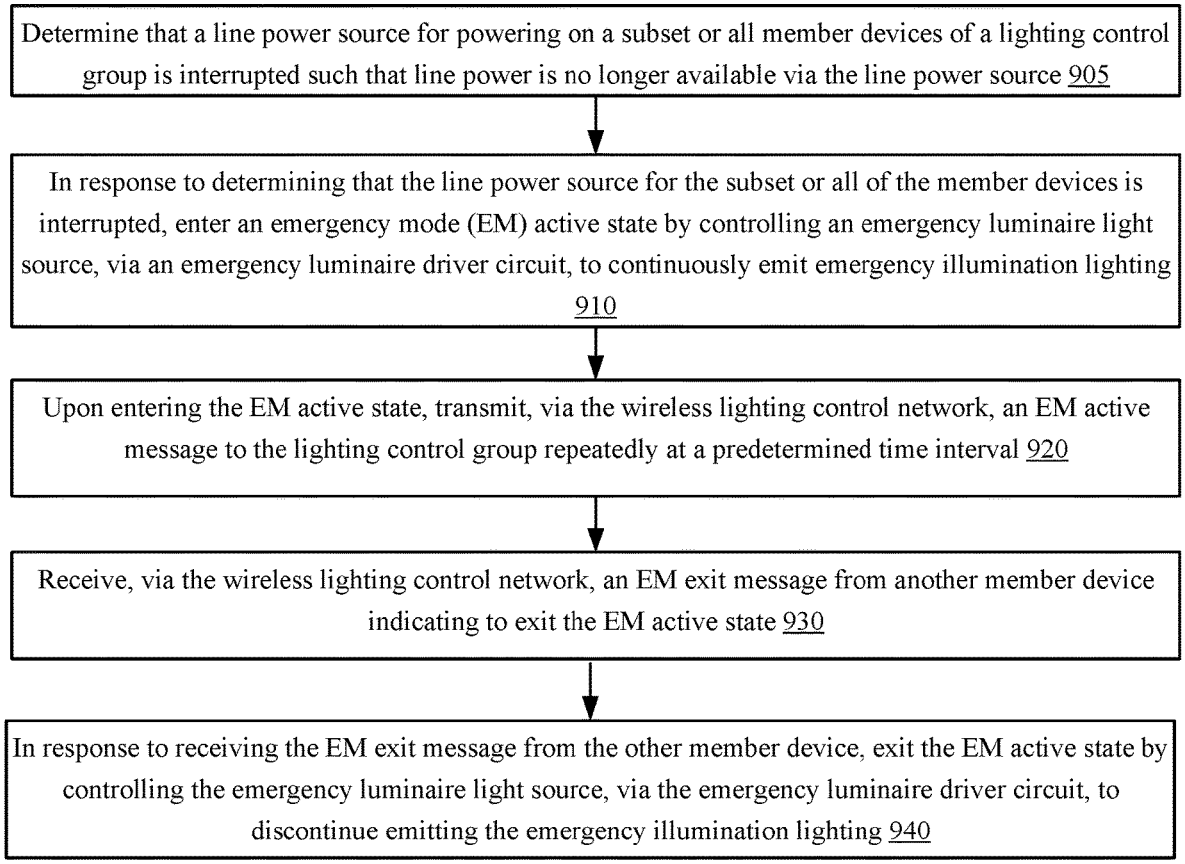
FIG. 9 is an automatic EM exit protocol network protocol procedure for enabling the EM device to automatically exit an emergency mode (EM) active state in the lighting control system of FIG. 1.

FIG. 9 is an automatic EM exit protocol network protocol 900 procedure for enabling the EM device 4A-L to automatically exit an emergency mode (EM) active state in the lighting control system 1 of FIG. 1. Beginning in block 905, EM device 4A determines that a line power source 301 for powering on a subset or all member devices 6A-Y of a lighting control group 8 is interrupted such that line power is no longer available via the line power source 301. Continuing to block 910, in response to determining that the line power source 301 for the subset or all of the member devices 6A-Y is interrupted, EM device 4A enters an emergency mode (EM) active state 241 by controlling an emergency luminaire light source 215, via the emergency luminaire driver circuit 210, to continuously emit emergency illumination lighting. In block 920, upon entering the EM active state 241, EM device 4A transmits, via the wireless lighting control network 5, an EM active message 242 to the lighting control group 8 repeatedly at a predetermined time interval 247.

Moving to block 930, EM device 4A receives, via the wireless lighting control network 5, an EM exit message 243 from another member device 6B-Y indicating to exit the EM active state 241. Finishing in block 940, in response to receiving the EM exit message 243 from the other member device 6B-Y, EM device 4A exits the EM active state 241 by controlling the emergency luminaire light source 215, via the emergency luminaire driver circuit 210, to discontinue emitting the emergency illumination lighting.

Any of the steps or functionality of the automatic emergency mode exit network protocol 900, described herein for member devices 6A-Y of the lighting control group 8 (e.g., EM devices 4A-L and non-EM devices 3A-M) of the wireless lighting control system 1 can be embodied in programming or one more applications as described previously. This includes, for example, EM device programming 236, group monitor programming 336, and non-EM device programming 436. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A non-transitory machine-readable medium comprising:
   a luminaire programming in a luminaire memory configured to store therein instructions to control operations of a light source, wherein execution of the luminaire programming by a luminaire processor configures a luminaire to implement functions, including functions to:
   in response to determining that a line power source for a subset or all member devices of a lighting control group is interrupted, enter an emergency active state to control the light source, via a driver circuit, to emit emergency illumination lighting;
   upon entering the emergency active state, transmit, via a wireless lighting control network, an emergency active state message to the lighting control group;
   receive, via the wireless lighting control network, an emergency exit message from a member device indicating to exit the emergency active state; and
   in response to receiving the emergency exit message from the member device, exit the emergency active state by controlling the light source, via the driver circuit, to discontinue emitting the emergency illumination lighting.

2. The non-transitory machine-readable medium of claim 1, wherein the emergency active state message is received, via the lighting control network, as a multicast or a broadcast.

3. The non-transitory machine-readable medium of claim 1, further comprising:
non-emergency lighting device programming, wherein execution of the non-emergency lighting device programming configures the non-emergency lighting device to implement functions, including functions to:
after being powered on by the line power source, receive, via the wireless lighting control network, the emergency active state message; and
in response to receiving the emergency active state message, initiate a timer for a predetermined wait period.

4. The non-transitory machine-readable medium of claim 3, wherein execution of the non-emergency lighting device programming configures the non-emergency lighting device to implement functions, including functions to:
upon expiry of the predetermined wait period, transmit an intermediary emergency exit message to the group monitor.

5. The non-transitory machine-readable medium of claim 4, wherein the intermediary emergency exit message is transmitted, via the lighting control network, to the group monitor as a unicast network packet.

6. The non-transitory machine-readable medium of claim 4, wherein:
the member device is the non-emergency lighting device;
execution of the non-emergency lighting device programming configures the non-emergency lighting device to implement functions, including functions to:
detect that the intermediary emergency exit message transmitted to the group monitor failed to successfully send to the group monitor; and
in response to detecting that the intermediary emergency exit message failed to successfully send to the group monitor, transmit, via the wireless lighting control network, the emergency exit message to the luminaire.

7. The non-transitory machine-readable medium of claim 3, wherein execution of the non-emergency lighting device programming configures the non-emergency lighting device to implement functions, including functions to:
in response to receiving, via the wireless lighting control network, the emergency exit message before expiry of the predetermined wait period, stop the timer and halt transmission of an intermediary emergency exit message to the group monitor.

8. The non-transitory machine-readable medium of claim 1, further comprising:
group monitor programming, wherein execution of the group monitor programming configures a group monitor to implement functions, including functions to:
after being powered on by the line power source, transmit, via the wireless lighting control network, the emergency exit message to the luminaire.

9. The non-transitory machine-readable medium of claim 8, wherein execution of the group monitor programming configures the group monitor to implement functions, including functions to:
receive, via the wireless lighting control network, a unicast emergency exit message from a non non-emergency lighting device; and
in response to receiving the unicast emergency exit message from the non-emergency lighting device, transmit, via the wireless lighting control network, to the luminaire the emergency exit message indicating to exit the emergency active state.

10. The non-transitory machine-readable medium of claim 9, wherein the emergency exit message is transmitted from the group monitor, via the wireless lighting control network, to the member devices of the lighting control group as a multicast.

11. The non-transitory machine-readable medium of claim 10, wherein execution of the group monitor programming configures the group monitor to implement functions, including functions to:
transmit the multicast addressed to the lighting control group as identified by a lighting control group identifier.

12. The non-transitory machine-readable medium of claim 11, wherein:
execution of the luminaire programming configures the luminaire to implement functions, including functions to:
listen, via the wireless lighting control network, for network packets addressed to the lighting control group identifier of the lighting control group; and
in response to receiving the multicast addressed to the lighting control group identifier, from the group monitor, exit the emergency active state.

13. The non-transitory machine-readable medium of claim 1, wherein the emergency active state includes an emergency (EM) mode of operation, an egress (ER) mode of operation, or both the EM mode of operation and the ER mode of operation.

14. A method for controlling operations of a light source, comprising:
sensing, via a line power sensor, interruption of line power conveyed from a line power source;
in response to sensing, via the line power sensor, that line power conveyed from the line power source is interrupted, transmitting, via a wireless lighting control network, a line power failure message indicating that that line power is interrupted to cause a subset or all member devices of a lighting control group to enter an emergency active state, wherein the emergency active state includes an emergency (EM) mode of operation, an egress (ER) mode of operation, or both the EM mode of operation and the ER mode of operation; and
in response to sensing, via the line power sensor, that line power conveyed from the line power source is available, transmitting, via the wireless lighting control network, an emergency exit message to cause the subset or all of the member devices of the lighting control group to exit the emergency active state.

15. The method of claim 14, further comprising:
in response to entering the emergency active state at the subset or all of the member devices, emitting emergency illumination lighting.

16. The method of claim 14, further comprising:
in response to receiving the emergency exit message at the subset or all of the member devices, discontinue emitting the emergency illumination lighting.

17. A method for controlling operations of a light source, comprising:

determining, at an emergency lighting device, that a line power source for powering on a subset or all member devices of a lighting control group is interrupted;

in response to determining that the line power source for the subset or all of the member devices is interrupted:
 entering an emergency active state at the emergency lighting device, and
 transmitting from the emergency lighting device, via a wireless lighting control network, an emergency active state message;

receiving at the emergency lighting device, via the wireless lighting control network, an emergency exit message from a member device indicating to exit the emergency active state; and in response to receiving the emergency exit message from the member device, exiting the emergency active state at the emergency lighting device.

18. The method of claim 17, further comprising:

after being powered on by the line power source, receiving at a non-emergency lighting device, via the wireless lighting control network, the emergency active state message; and in response to receiving the emergency active state message, initiating, at the non-emergency lighting device, a timer for a predetermined wait period; and upon expiry of the predetermined wait period, transmitting an intermediary emergency exit message to a group monitor of the lighting control group.

19. The method of claim 18, further comprising:

receiving, via the wireless lighting control network, at the group monitor, the intermediary emergency exit message from the non-emergency lighting device; and in response to receiving the intermediary emergency exit message from the non-emergency lighting device, transmitting from the group monitor, via the wireless lighting control network, to the emergency lighting device, the emergency exit message indicating to exit the emergency active state.

20. The method of claim 19, wherein the emergency exit message is transmitted from the group monitor, via the wireless lighting control network, to the member devices of the lighting control group as a multicast EM exit network packet.

21. The method of claim 17, wherein the emergency lighting device is a member of the lighting control group.

22. The method of claim 17, wherein the emergency active state includes an emergency (EM) mode of operation, an egress (ER) mode of operation, or both the EM mode of operation and the ER mode of operation.

* * * * *